United States Patent [19]

Namiki et al.

[11] Patent Number: 4,792,656

[45] Date of Patent: Dec. 20, 1988

[54] INVERTOR TYPE DC RESISTANCE WELDING MACHINE

[75] Inventors: Mitsuo Namiki, Urawa; Keiji Nishizawa, Nagareyama, both of Japan

[73] Assignee: Miyachi Electronic Company, Noda, Japan

[21] Appl. No.: 95,108

[22] Filed: Sep. 11, 1987

[30] Foreign Application Priority Data

Sep. 17, 1986 [JP] Japan ............................. 61-218856
Oct. 18, 1986 [JP] Japan ............................. 61-247895

[51] Int. Cl.$^4$ ............................................ B23K 11/24
[52] U.S. Cl. ................................................. 219/110
[58] Field of Search ................................. 219/110, 108

[56] References Cited

U.S. PATENT DOCUMENTS

4,302,653 11/1981 Denning et al. ................... 219/110

FOREIGN PATENT DOCUMENTS

58-84689 5/1983 Japan ................................ 219/110
60-137581 7/1985 Japan ................................ 219/110

Primary Examiner—Clifford C. Shaw
Attorney, Agent, or Firm—Wenderoth, Lind & Ponack

[57] ABSTRACT

Disclosed is an invertor type DC welding machine incorporating constant-voltage control to assure a high and reliable quality of weld. The pulse width of the high-frequency output of the invertor circuit is controlled at the invertor switching rate by the constant-voltage control on a feedback loop basis in which a DC weld voltage applied to the workpieces to be welded between electrodes is detected and is compared with the value of a reference weld voltage to produce an error signal for controlling the operation of the invertor circuit, so that the DC weld voltage is maintained constant regardless of variations in the resistance of the portion to be welded during a welding operation. A timing system is further provided which momentarily monitors the change in the resistance between electrodes to terminate the welding operation at an optimum time after a nugget is produced in the porton to be welded.

5 Claims, 3 Drawing Sheets

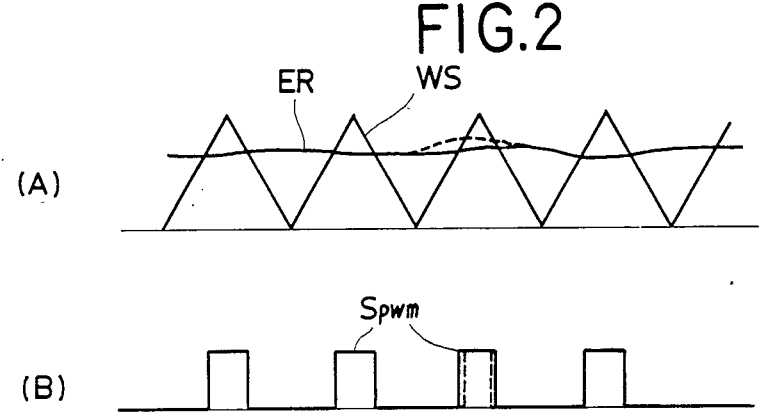
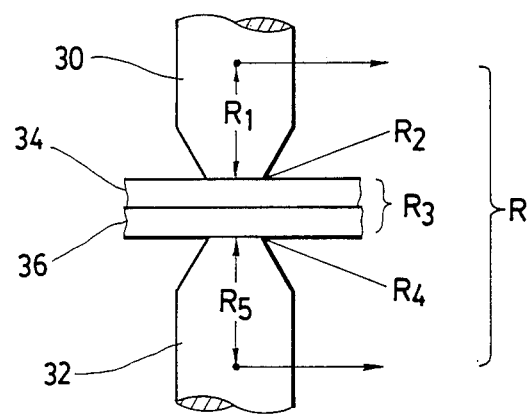
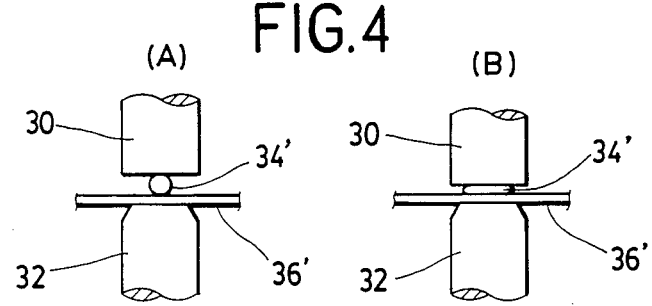

INVERTOR TYPE DC RESISTANCE WELDING MACHINE

BACKGROUND OF THE INVENTION

This invention relates to a DC resistance welding machine incorporating an invertor and, more particularly to a control system for such welding machine assuring a high and reliable quality weld.

Recently, DC resistance welding machines that utilize an invertor in its power circuit referred hereinafter as invertor type welding machine have been developed and are spreading in the market.

As compared with conventional single phase AC resistance welding machine, the invertor type DC resistance welding machine has the following advantages.

First, it is possible to reduce the size of a welding transformer incorporated in the invertor type welding machine since a high-frequency power is supplied to the transformer. In applying the welding machine to a welding robot, such small sized transformer can be mounted on an end portion of an arm of the robot with no cable or electrical wire being required between the secondary coil of the transformer and a welding gun, thereby saving both cost and power consumption.

Secondly, DC welding by the invertor type welding machine is of higher heating efficiency, and requires a smaller weld current flow or conduction in workpieces as compared with AC welding by the AC welding machine, thus, it is economical in power consumption and the life of electrodes can be elongated.

Thirdly, commercial three phase AC can be utilized as the power source of the invertor type welding machine, in which three phase balanced load and high power factor are obtained.

Heretofore proposed invertor type DC welding machines generally incorporate a constant-current controller or timer which functions to maintain constant the RMS value of weld current flowing during a welding operation. The controller or the timer is based on the idea of a constant-current phase control system of the single phase AC type welding machine and the weld current is deemed as the principal requirement to obtain stable and high quality weld.

However, the weld current is DC in the invertor type welding machine while AC in the single phase AC type welding machine, and when such DC weld current is maintained constant, there arise some disadvantages. When a pressure applied on electrodes is low or insufficient, for example, the portions to be welded of the workpieces being located between electrodes are in a high resistance conditions. In maintaining the weld current constant under such condition, it sometimes makes the resistance heat generation excessive which may cause splashing or explosion of the molten workpieces. Furthermore, when the weld current is maintained constant even though the contact area between the electrodes and the workpieces has become increased due to wear or abrasion of the tips of electrodes, it sometimes results in that the current density in the portion to be welded is too low to generate a sufficient quantity of resistance heat for obtaining a good weld bond.

Moreover, it is difficult to terminate a relatively short duration of welding operation, particularly for workpieces such as small metal assemblies or thin sheet of metal, at a suitable timing after a nugget is produced in the portion of the workpieces to be welded. In other words, premature termination may lead to shortage of weld energy while delayed termination to splashing which seriously affects the weld quality of such small workpieces.

SUMMARY OF THE INVENTION

It is an object of the present invention to provide an invertor type DC resistance welding machine which causes no splashing or flashing of molten workpieces, assuring high and reliable quality of weld.

It is another object of the present invention to provide an invertor type DC resistance welding machine which ensures weld quality kept from deterioration even though the tips of electrodes are worn.

It is a further object of the present invention to provide an invertor type DC resistance welding machine which enables it to terminate a very short period of welding operation for small workpieces with the optimum timing to obtain a good weld bond.

In accordance with an aspect of the present invention a constant-voltage control is provided which operates at the invertor switching rate to maintain constant a DC weld voltage applied to electrodes squeezing therebetween workpieces during welding operation, thereby preventing the occurrence of splashing or flashing of the molten workpieces.

In accordance with another aspect of the present invention, a timing system is provided which momentarily monitors the change in the resistance between electrodes to detect the maximum of the resistance, and thereafter, momentarily monitors the drop in the resistance from the maximum to detect when the resistance drop falls within a predetermined range and to then immediately terminate the welding operation, thereby providing a reliable weld bond.

BRIEF DESCRIPTION OF THE DRAWINGS

The foregoing and other objects, features and advantages of the present invention will become apparent from the following description taken in connection with the drawings in which:

FIG. 2 is a waveform for explaining the function of a constant-voltage control in the embodiment;

FIG. 3 is a schematic view illustrating a resistance welding;

FIG. 4 is a schematic view illustrating a change in the shape of the portions of workpieces being welded between the beginning and the last stage of a welding operation for small workpieces;

PREFERRED EMBODIMENT OF THE INVENTION

Figure 1:
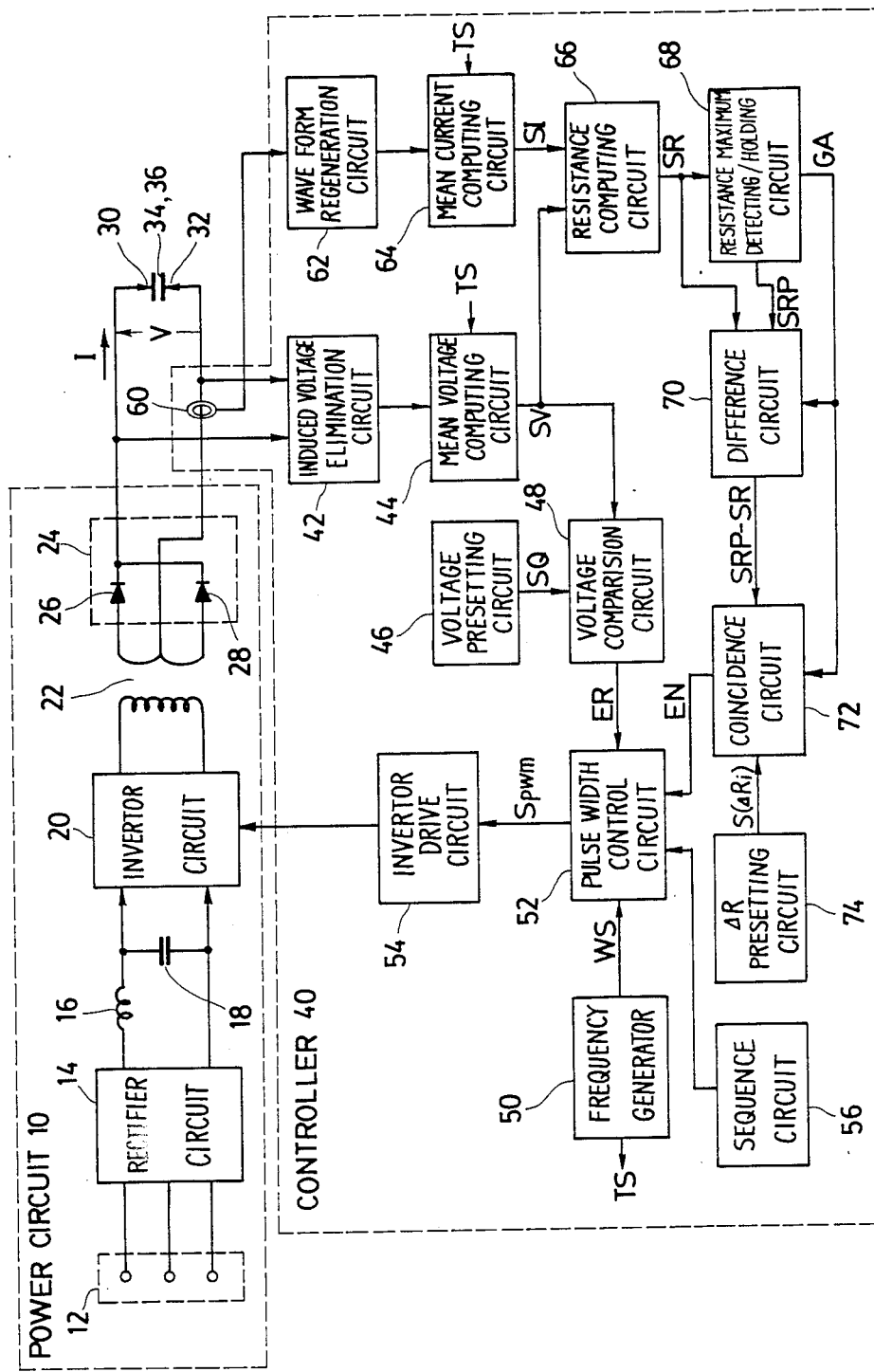
FIG. 1 is a block chart of an invertor type DC welding machine according to a preferred embodiment of the present invention.

Referring now to FIG. 1, there is shown an invertor type DC resistance welding machine according to a preferred embodiment of the present invention. The welding machine includes a power circuit 10, a pair of electrodes designated 30 and 32 and a controller 40.

The power circuit 10 includes a rectifier circuit 14, an invertor circuit 20, a welding transformer 22 and a rectifier circuit 24.

The rectifier circuit 14 receives a commercial three phase AC voltage through a power source terminal 12 and generates a DC voltage which is supplied through a smoothing circuit consisting of a coil 16 and a capacitor 18 to the invertor circuit 20, which in turn converts the DC voltage into a pulse-shaped voltage having a high-frequency, for example 1 KHz. The invertor circuit 20 may conventionally comprise one or more power transistors or field effect transistors, and the switching operation of the circuit 20 and the resulting pulse width of the high-frequency voltage are controlled by the controller 40 as will be described hereinafter.

The high-frequency voltage from the invertor circuit 20 is supplied to the welding transformer 22 which lowers the high-frequency voltage at a predetermined ratio and, thereafter, is rectified by the rectifier circuit 24 consisting of a pair of diodes 26 and 28 into a DC weld voltage V. The DC weld voltage V is applied on workpieces 34 and 36 to be welded through the electrodes 30 and 32 which squeeze therebetween the workpieces 34 and 36 with an adequate pressure during a welding operation.

The controller 40 includes a constant-voltage control comprising an induced voltage elimination circuit 42, a mean voltage computing circuit 44, a voltage presetting circuit 46, a voltage comparison circuit 48, a frequency generator 50, and a pulse width control circuit 52. The circuit 42 eliminates a high-frequency induced voltage from a detection voltage sensed through the lines connected to the electrodes 30 and 32, and provides the output voltage to the mean voltage computing circuit 44. The mean voltage computing circuit 44 receives from the frequency generator 50 a timing signal TS having the same frequency as the invertor switching frequency, and the circuit 44 computes the mean value of the DC weld voltage applied between the electrodes 30 and 32 per the period of the timing signal TS and provides a signal SV representing the computed mean value to the voltage comparison circuit 48. The voltage presetting circuit 46 provides to the voltage comparison circuit 48 a reference signal SQ corresponding to a desired value preset as a reference weld voltage. The comparison circuit 48 compares the one iuput signal SV with the other input signal SQ to produce an error signal ER as a comparison error between the computed value of the actual weld voltage and the preset value of the reference weld voltage.

The output of the voltage comparison circuit 48 or the error signal ER is supplied to the pulse width control circuit 52 for controlling the high-frequency output of the invertor circuit 20 on a PWM (pulse width modulation) basis. The pulse width control circuit 52 receives a modulation signal WS such as a triangular waveform signal having the invertor switching frequency from the frequency generator 50 and, compares the error signal ER with the modulation signal WS to produce a PWM signal Spwm having binary levels "high" and "low". The PWM signal Spwm is supplied via the invertor drive circuit 54 to the invertor circuit 20 to control the ON/OFF switching operation of the transistors therein. A sequence circuit 56 provides the instructions for starting and terminating a welding operation to the pulse width control circuit 52.

The constant-voltage control system functions as follows. When the actual DC weld voltage V changes, the output signal SV from the mean voltage computing circuit 44 correspondingly changes, and therefore the error signal ER from the voltage comparison circuit 48 changes correspondingly. For example, when the DC voltage V rises, the error signal ER rises correspondingly as shown by broken line in FIG. 2-A. Hence, the pulse width of the PWM signal Spwm from the pulse width control circuit 52 is reduced as shown by broken lines in FIG. 2-B and, thereby, the pulse width of the high-frequency voltage from the invertor circuit 20 is correspondingly reduced so that the DC weld voltage V is lowered. In this way, the DC weld voltage V is controlled to be maintained constant on a feedback loop basis at the invertor switching rate, so that even though the resistance between the electrodes 30 and 32 changes, the weld current I is increased or decreased in rapid response to the change of the resistance, to thereby assure reliable quality weld.

Referring to FIGS. 3 and 4, the operation and effect of the constant-voltage control system will be described in more detail.

In FIG. 3, it is shown that the electrode 30 and 32 are pressed at a predetermined pressure against the opposite sides of workpieces 34 and 36. Under such condition, the DC weld voltage V is applied between the electrodes 30 and 32 so that the weld current I flows through the electrodes 30 and 32 and the workpieces 34 and 36. Symbols R1 and R5 denote the resistance of the electrodes 30 and 32 respectively, R2 and R4 denote the resistances of the contact surfaces between the electrodes 30 and 32 and the workpieces 34 and 36 respectively, and R3 the total resistance of the workpieces 34 and 36. Each of the resistances R1~R5 when the weld current I flows, genarates an amount of heat according to Joul's law. Thus, the DC weld voltage V is expressed by the following equation.

$$V = IR = I(R1 + R2 + R3 + R4 + R5)$$

In accordance with the constant-voltage system of the present invention, changes in any of the resistance R1~R5 during a welding operation are compensated by the change in the weld current I at the invertor switching rate on a closed loop basis so as to maintain the DC weld voltage V substantially constant, thereby providing the following effects:

(A) To restrain splashing or flashing of the molten workpieces 34 and 36 during welding operation;
(B) To prevent deterioration of the weld quality when the tips of the electrodes 30 and 32 are worn;
(C) To permit the resistance welding to be effectively applied to workpieces such as surface-treated steel plates;
(D) To assure a reliable quality weld for such workpieces as small metal assemblies or sheet metal.

As to item (A), the splashing or flashing is mostly caused by a shortage of weld pressure, a poor contact between workpieces or the use of thin electrodes, all of which will lead to rises in the contact resistances R2 and R4. By the constant-voltage control system, however, the weld current I is decreased in inverse proportion to the increase in the resistances R2 and R4 so that the increase in the weld current I relative to the whole resistance R is suppressed, thus preventing the occurrence of the splashing or flashing.

As to item (B), when the tips of the electrodes 30 and 32 are worn, the contact areas between the electrodes and workpieces are increased which will make the current density therein decreased. At the same time, but, the resistances R2 and R4 are lowered due to the increase in the contact areas, and hence the weld current is increased in inverse proportion to the lowering of the resistance R2 and R4, resulting in that the current density is kept from decreasing.

Regarding item (C), the whole resistance R varies widely with the type of surface-treatment of the workpieces 34 and 36 in case where they are surface-treated steel plates. For example, the resistasnce R is relatively low in the case of zinc galvanizing steel sheet or lead plating steel, and on the other hand the resistance R is relatively high in the case of chemically surface-treated steel or zinc plating steel. By the constant-voltage control system, the weld current I is controlled to increase in the former case, while it is controlled to decrease in the latter case.

Regarding item (D), such small workpieces are apt to be considerably deformed at their portions to be welded during a very short time period of welding operation, exemplified by 10~20 msec. As shown in FIG. 4, for instance, a small sized metal 34' having a spherical configuration is in line-contact with a thin metal plate 36' at the beginning of the welding operation (FIG. 4-A), and the metal 34' is compressed or collapsed and is in surface-contact with the plate 36' at the last stage of the welding operation (FIG. 4-B). When the weld current I is maintained constant for such workpieces 34' and 36', a splashing of molten metal may occur at the beginning of the welding operation, while there may be a shortage of weld current in the last stage of the welding operation. However, in accordance with the constant-voltage control system, the weld current I is changed in the manner that it is suppressed at a relatively low value at the beginning of the welding operation and is increased as the welding operation proceeds, resulting in a good result of welding, and the control is performed at the invertor switching rate.

It is noted that even though there are variations in the line voltage, a secure strength of weld bond is guaranteed owing to the constant-voltage control system. Namely, the comparison error in the voltage comparison circuit 48 reflects variations in the line voltage, and in rapid response to the comparison error the pulse width of the high-frequency output of the invertor circuit 20 is adjusted to compensate the line voltage variations, to thereby provide a constant-maintained weld voltage.

Referring again to FIG. 1, the controller 40 further includes a timing system for terminating welding operation at an optimum time after a nugget is produced in the portion to be welded.

The timing system comprises a troidal coil 60, a waveform regeneration circuit 62, a mean current computing circuit 64, and a resistance computing circuit 66. The troidal coil 60 encircles a cable connecting one output terminal of the rectifier circuit 24 with the electrode 32, and the troidal coil 60 when the weld current I flows generates an output voltage representing the differential waveform of the weld current I. The output voltage of the troidal coil 60 is supplied via the waveform regeneration circuit 62 comprising an integrating circuit to the mean current computing circuit 64. The circuit 64 further receives the timing signal TS from the frequency generator 50 and computes the mean value of the weld current I per the period of the timing signal TS and provides a signal SI representing the mean current value to the resistance computing circuit 66, to which the output signal SV from the mean voltage computing circuit 44 is also applied. The resistance computing circuit 66 divides the mean voltage value (SV) by the mean current value (SI) to produce a signal SR representing the mean value of the whole resistance R of the portions to be welded between the electrodes 30 and 32 per the period of the timing signal TS.

The timing system further comprises a resistance maximum detecting and holding circuit 68, a difference circuit 70, a coincidence circuit 72, and a $\Delta R$ presetting circuit 74. The circuit 68 receives the output signal SR from the resistance computing circuit 66 and monitors the change in the signal SR (the resistance R) to detect when the signal SR (the resistance R) reaches the maximum SRP(RP). Then, the circuit 68 holds the maximum value SRP and provides it to the difference circuit 70 while providing an enabling signal GA to the difference circuit 70 and to the coincidence circuit 72. The difference circuit 70 also receives the output signal SR from the resistance computing circuit 66, and in response to the enabling signal GA, subtracts SR from SRP and provides the resulting difference signal (SRP−SR) to the coincidence circuit 72. As described later, the difference signal (SRP-SR) changes momentarily in correspondence to $\Delta R$, the quantity of drop in the resistance R from its maximum RP. The coincidence circuit 72 receives from the $\Delta R$ presetting circuit 74 a signal $S(\Delta R)$ representing a reference $\Delta Ri$ preset within a predetermined range. Thus, when the difference signal (SRP−SR) from the difference circuit 70 coincides with the reference signal $\Delta Ri$, the coincidence circuit 72 generates a termination command signal as its output signal which is supplied to the pulse width control circuit 52 for terminating the operation of the invertor circuit 20 to stop the supply of the weld current I to the workpieces.

Next, the principle on which the timing system of the present invention is based will be described with reference to FIG. 5 and FIG. 6.

Figure 5:
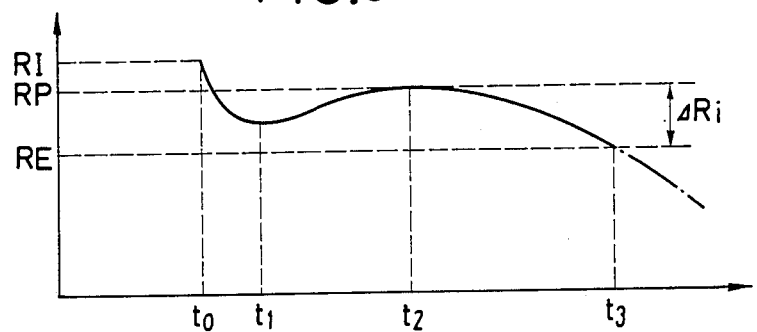
FIG. 5 is a diagram showing a change in the resistance of the portions being welded between electrodes with respect to the time during a resistance welding operation.

In FIG. 5, there is shown the change in the resistance R between the electrodes 30 and 32 with respect to the time during welding operation in case where the workpieces 34 and 36 are mild steel plates. At the time t0 immediately after the welding operation is commenced, the resistance R is at a high initial value RI, to which the contact resistances R2 and R4 mainly contribute. As the welding operation proceeds, the contact resistances R2 and R4 rapidly decrease and the whole resistance R correspondingly decreases, thereafter, due to the rise in temperature the inherent resistance gradualy increases and the resistance R turns to increase from the time t1 and reaches the maximum value RP at time t2. Then, a nugget begins to be produced in the portion to be welded, and as the nugget grows, the resistance R decreases and at time t3 reaches a value RE which is lower by $\Delta Ri$ than the maximum value RP.

Figure 6:
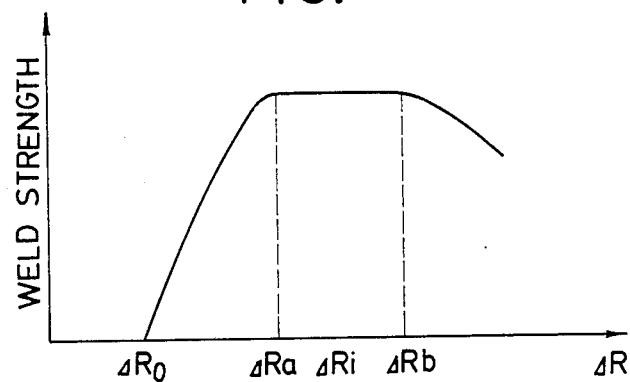
FIG. 6 is a diagram showing the relationship between the drop ($\Delta R$) in the resistance (R) from the maximum value RP at which the welding operation is terminated, and the strength of the resulting weld bond.

Referring to FIG. 6, there is shown the relationship between the drop $\Delta R$ in resistance R from the maximum value RP with which the welding operation is terminated, and the strength of the resulting weld bond. When $\Delta R$ is either less than $\Delta Ra$ or more than $\Delta Rb$, the weld strength obtained is poor due to shortage or excess of the welding energy, particularly the latter (excess)

tends to cause splashing. When ΔR is within the range of ΔRa and ΔRb, the corresponding weld strength is enough to assure reliable quality weld. This means in FIG. 5 that the optimum timing to terminate the welding operation is time t3 at which ΔRi becomes within the range of ΔRa and ΔRb.

In the timing system of the present invention, accordingly, ΔRi is preset within such specific range in the circuit 52 so that the termination command signal EN is generated by the coincidence circuit 72 at the optimum time that the nugget has grown to the utmost condition to provide a sufficient strength of weld bond. As described above, the timing system operates at the invertor switching rate (high-frequency over 1 KHz) and, therefore, it can effectively be applied to a very short time period of welding operation for small workpieces.

It is noted that a microcomputer or microprocessor can be utilized to constitute the elements or functional blocks 64 to 74 of the timing system as well as those 44 to 52 of the constant-voltage system.

Although, a particular embodiment of the invention has been shown and described, alternations and modifications can be made by persons skilled in the art without departing from the scope of the present invention defined by the accompanying claims.

What is claimed is:

1. A DC resistance welding machine including a first rectifier circuit for rectifying a commercial AC voltage into a DC voltage, a converting circuit for converting said DC voltage into a pulse-shaped voltage having a predetermined high-frequency, a welding transformer for transforming said pulse-shaped high-frequency voltage, and a second rectifier circuit for rectifying said pulse-shaped high-frequency voltage into a DC weld voltage, said DC weld voltage being applied to workpieces to be welded between electrodes so that a DC weld current for a resistance welding flows through said electrodes and said workpieces, said welding machine comprising:
    a detection means for detecting said DC weld voltage;
    a reference means for presetting a reference weld voltage to a constant value;
    a comparison means for comparing the detected DC weld voltage with said reference weld voltage to produce an error signal representative of the comparison error, and
    a control means responsive to said error signal for generating a control signal which is supplied to the converting circuit for controlling the pulse width of said pulse-shaped high-frequency so as to maintain said DC weld voltage applied between said electrodes at a constant value during a welding operation.

2. A DC resistance welding machine as defined in claim 1, wherein said detection means comprises a noise reduction circuit for eliminating a high-frequency induced voltage from a voltage sensed through lines connected to said electrodes and a computing circuit for receiving an output voltage from said noise reduction circuit and for computing the mean value of said DC weld voltage at the rate of said predetermined high-frequency.

3. A DC resistance welding machine as defined in claim 1, wherein said pulse width control means comprises a pulse width modulation circuit which responds to said error signal from said comparison means to produce a pulse width modulation signal for controlling the switching operation of said converting means.

4. A control system for a DC resistance welding machine including an invertor in its power circuit comprising:
    a means for detecting a DC weld voltage applied between electrodes being depressed against workpieces during a welding operation;
    a means for presetting a reference weld voltage to a constant value;
    a means for comparing the detected DC weld voltage with said reference weld voltage to produce an error signal representative of the comparison error, and
    a means responsive to said error signal for generating a control signal which is supplied to the invertor for controlling the pulse width of a pulse-shaped high-frequency output voltage of said invertor at the rate of the invertor swithcing frequency so as to maintain said DC weld voltage applied to said electrodes at a constant value during a welding operation.

5. A DC resistance welding machine including a first rectifier circuit for rectifying a commercial AC voltage into a DC voltage, a converting circuit for converting said DC voltage into a pulse-shaped voltage having a predetermined high-frequency, a welding transformer for transforming said pulse-shaped high-frequency voltage, and a second rectifier circuit for rectifying said pulse-shaped high-frequency voltage into a DC weld voltage, said DC weld voltage being applied to workpieces to be welded between electrodes so that a DC weld current for a resistance welding is supplied to said electrodes and said workpieces, said welding machine comprising:
    a voltage detection means for detecting said DC weld voltage;
    a voltage reference means for presetting a reference weld voltage to a constant value;
    a means for comparing the detected DC weld voltage which said reference weld voltage and producing an error signal representative of the comparison error;
    a control means responsive to said error signal for generating a control signal which is supplied to the converting circuit for controlling the pulse width of said pulse-shaped voltage at the rate of said predetermined high-frequency so as to maintain said DC weld voltage applied between said electrodes at a constant value during a welding operation;
    a current detection means for detecting said DC weld current;
    a resistance computing means for computing the value of the resistance between said electrodes on the basis of the detected values of said DC weld voltage and of said DC weld current;
    a resistance reference means for presetting a reference drop of resistance to a value within a specific range;
    a monitor means for monitoring the change in the computed value of said resistance for detecting the resistance maximum and thereby detecting when the drop in said resistance from said maximum reaches said reference drop of resistance to produce a timing signal, and
    a termination means responsive to said timing signal for terminating the operation of said invertor to stop the supply of said weld current to said workpieces.

* * * * *